US009468835B2

(12) United States Patent
Martikka et al.

(10) Patent No.: US 9,468,835 B2
(45) Date of Patent: Oct. 18, 2016

(54) COMMUNICATION MODULE FOR PERSONAL PERFORMANCE MONITORING AND A RELATED DEVICE, SYSTEM AND METHOD

(71) Applicant: Suunto Oy, Vantaa (FI)

(72) Inventors: Mikko Martikka, Vantaa (FI); Kimmo Pernu, Vantaa (FI); Erik Lindman, Vantaa (FI)

(73) Assignee: Suunto Oy, Vantaa (FI)

( * ) Notice: Subject to any disclaimer, the term of this patent is extended or adjusted under 35 U.S.C. 154(b) by 37 days.

(21) Appl. No.: 14/585,260

(22) Filed: Dec. 30, 2014

(65) Prior Publication Data

US 2015/0182842 A1    Jul. 2, 2015

(51) Int. Cl.
*H04Q 9/00* (2006.01)
*A63B 71/06* (2006.01)

(52) U.S. Cl.
CPC ............... *A63B 71/06* (2013.01); *H04Q 9/00* (2013.01); *H04Q 2209/43* (2013.01)

(58) Field of Classification Search
CPC ..... A63B 71/06; H04Q 9/00; H04Q 2209/43
USPC ................................................. 340/870.07
See application file for complete search history.

(56) References Cited

U.S. PATENT DOCUMENTS

| 4,583,547 A | 4/1986 | Granek et al. |
| 5,921,938 A | 7/1999 | Ayoama et al. |
| 7,698,101 B2 | 4/2010 | Alten et al. |
| 8,253,586 B1 | 8/2012 | Matak |
| 2004/0008661 A1 | 1/2004 | Myles et al. |
| 2007/0135692 A1 | 6/2007 | Hwang et al. |
| 2008/0234935 A1 | 9/2008 | Wolf et al. |
| 2008/0319330 A1 | 12/2008 | Juntunen et al. |
| 2009/0082635 A1 | 3/2009 | Baldus et al. |
| 2012/0030229 A1 | 2/2012 | Ji et al. |
| 2012/0252530 A1* | 10/2012 | Yuen ............... A61B 5/222 455/557 |
| 2013/0096704 A1 | 4/2013 | Case, Jr. |
| 2015/0182795 A1* | 7/2015 | Martikka ........ A63B 24/0062 340/870.07 |
| 2015/0182841 A1* | 7/2015 | Martikka ........... A63B 71/06 340/870.07 |

FOREIGN PATENT DOCUMENTS

| EP | 1070479 A2 | 1/2001 |
| EP | 1531726 B1 | 12/2009 |
| WO | WO 2012042437 A2 | 4/2012 |

\* cited by examiner

*Primary Examiner* — Juan A Torres
(74) *Attorney, Agent, or Firm* — Seppo Laine Oy

(57) ABSTRACT

The invention relates to a communication module, monitoring unit and method of monitoring a physical performance. The module has a receiving unit, processing unit and wireless communications unit. With these units the module continuously receives sensor signals from a sensor connected to the communication module, processes the sensor signals to form a plurality of successive data messages containing data at least partly derived from the sensor signals, and transmits the formed data messages to an external wireless receiver device at a plurality of successive transmission time slots using a wireless communication protocol. The processing unit is adapted to add information to the data messages regarding the difference between first time points based on predefined characteristics of the sensor signals and second times points corresponding to transmission slots. The invention allows for relating the individual signals temporally with each other for better overall analysis of the performance.

22 Claims, 9 Drawing Sheets

| Time | Module | Signal | Strength |
|---|---|---|---|
| 4:56:34:23 | D | Leg Muscle EMG | 1 |
| 4:56:34:47 | B | Racket accel. | 0.4 |
| 4:56:34:50 | C | Shoe accel. | 1 |
| 4:56:34:59 | C | Shoe accel. | 1 |
| ... | ... | ... | ... |
| 4:56:35:46 | D | Leg muscle EMG | 2.3 |
| 4:56:35:59 | C | Shoe accel. | 1.2 |
| 4:56:35:64 | A | Heartbeat EMG | 1 |
| ... | ... | ... | ... |

COMMUNICATION MODULE FOR PERSONAL PERFORMANCE MONITORING AND A RELATED DEVICE, SYSTEM AND METHOD

FIELD OF THE INVENTION

The invention relates to communication systems used in personal performance monitoring for example during sports acts. In particular, the invention relates to a novel communication module suitable for communicating sensor signals, such as EMG signals. The invention also relates to a monitoring device and a performance-monitoring method.

BACKGROUND OF THE INVENTION

It is well known to measure electromyographic (EMG) signals from different parts of a human body during sports performances, the most common example being hear beat measurement using a surface EMG sensor-containing heart beat belt with a wireless transmitter module for communicating with a monitoring device, such as a sports watch. Measurement of surface EMG signals also from other parts of the body to monitor muscle activity in legs, arms, middle body or torso, for example. Such measurements can be carried using EMG sensors for example integrated into sports garment. It is also known to integrate signal transmitter modules into the belt or garment or to provide the module as a snap-on module to an assembly zone on the garment or belt. The module can be removed for washing the garment, for example. One disadvantage in known systems is that, although the transmitter can be removable and reconnectable, each sensor or sensor group requires a specifically designed transmitter module in order to operate properly.

To mention some specific examples, U.S. Pat. No. 8,253,586 discloses a performance measuring system comprising an article of clothing with an integrated measuring sensor and additionally a communication module, power module and computing module attachable to the article of clothing. The modules can be removed from one article of clothing and used in another article of clothing, while the sensor remains in the article. EP 1531726 discloses the use of a multitude of surface EMG electrodes to gain information simultaneously from muscles in various parts of the body. Also U.S. Pat. No. 4,583,547 relates to a similar application and in particular how conductive paths in garment can be arranged to provide a sensor signal form the measurement point to the signal transmitter module.

US 2008/0319330 discloses as a further example of currently available techniques a mobile transmitter for observing performance-related events and transmitting data on the observed events to a receiver. The transmitter comprises a timer for providing time references relating to the events and a memory for recording time references. The transmitter obtains a time reference from the timer and records the obtained time reference in the memory and is adapted to produce data messages containing a predetermined number of time references obtained from the memory and further to transmit the produced data messages to the receiver. The disclosed system allows for time stamping of events, such as heartbeats, and calculating the frequency and/or interval variation parameters of heartbeats. The system does not allow for synchronizing events from different detector sources.

U.S. Pat. No. 7,698,101 discloses a system for pairing sensor-containing shoes with measurement electronics, including authentication of the shoes for the electronics. Also these solutions require dedicated transmitter module sensor pairs in order to be able to transmit the measurement signal to a monitoring unit. US 2013/0096704 discusses articles of clothing and module capable of sensing physical and/or physiological characteristics associated with the use of the clothing. The module contains one or more integral sensors. The system can activate the module or sensor in it upon engaging the module to the clothing and confirm that the clothing and the module are authorized for use with one another and/or for automatic data processing algorithm selection. The flexibility of the system is, however, restricted to adaptation of the sensor module to use its built-in sensor in different ways depending on the clothing it is attached to. Thus, several modules are still needed or a single module needs to be equipped with a plurality of sensors if different types of signals are to be measured.

One problem also touched by the abovementioned publications in a multi-sensor system is the communication of the different EMG measurement signals to a single monitoring device. There are systems, which utilize wired communication channels from a plurality of sensors to a single module. Such systems become impractical if there is a need to use many sensors at distant body parts and potentially separate belt or garment units.

An additional problem in existing systems is how to handle signals from a plurality of sensor sources such that an overall analysis of the performance would be possible. In particular in wireless communication systems, a monitoring unit can relatively easily collect data from several sources, but may still lack information on the relationship of the data to each other and/or the performance.

Thus, there exists a need for improved solutions for facilitating communication between a plurality of sensors and a central monitoring unit to allow for better analysis of the performance.

SUMMARY OF THE INVENTION

It is an aim of the invention to solve at least some of the abovementioned problems and to provide a communication module, which allows for signaling more performance-related data from a plurality of sensors to the monitoring unit. A particular aim is to provide a solution, which allows for better temporal analysis of the performance using a plurality of different sensors.

An aim of the invention is also to provide a related monitoring unit.

A further aim is to provide a method of monitoring a physical performance of a person arranging a communication link between a peripheral unit and a central monitoring unit.

The invention is based on messaging sensor-derived data from a plurality of sensors through communication modules which are capable of determining and including information on the time elapsed between signal formation and messaging into messages transmitted between the devices.

The invention provides a communication module for monitoring physical performance, comprising means for receiving sensor signals from a sensor connected to the communication module, a processing unit adapted to process the sensor signals and to form a plurality of successive data messages containing data at least partly derived from the sensor signals, and a wireless communication unit for transmitting the formed data messages to an external wireless receiver device at a plurality of successive transmission time slots using a wireless communication protocol. According to the invention, the processing unit is adapted to execute a sensor signal analysis algorithm so as to determine first time points based on predefined characteristics of the sensor signals, to determine second time points corresponding to the temporal transmission slots for transmitting of data messages corresponding to the characteristics using the wireless communication unit, and to add information on the difference between the first and second time points to the data messages. In one preferred embodiment, the signal processing takes place essentially continuously and the communication protocol is a time slot based protocol.

The present monitoring unit capable of receiving and processing the data messages comprises means for receiving a plurality of successive messages from a plurality of communication modules each connected to one or more sensors, the messages each comprising at least a first data field comprising first data derived from a respective sensor and a second data field comprising second data on the time of origin of said first data. The unit also comprises processing means capable of extracting from the messages said first data and said second data and means for storing at least part of the first data extracted from said plurality of messages in a chronological order in a data structure based on said second data. The first data may simply be an indication of existence of a detected characteristic feature of a signal or a quantitative measure of the feature, such as strength or duration, depending on the phenomenon measured.

The present method of analyzing a physical performance of a person comprises measuring at least two different performance-related signals at different locations of the body or equipment of the person using at least two different sensors attached to at least two different communication modules, respectively, and transferring messages containing data derived from said signals from the communication modules wirelessly to a central monitoring unit. The method further comprises determining time differences between formation of said signals and said transferring of the messages corresponding to said signals, including information on the time differences to said messages, and processing the data contained in the messages in the central monitoring unit using the information on the time differences. The processing preferably includes arranging the data in a chronological order, i.e. order corresponding to real temporal occurring of the phenomena relating to the data, based on the time information.

More specifically, the invention is defined in the independent claims.

The invention has considerable advantages. First, the invention allows for temporally relating the individual features of the measured signals to each other, irrespective of the messaging protocol used. Because each message contains information on the delay from measurement to messaging, the recipient of the messages has enough information on the real chronological order of the events measured.

The invention suits for many kinds of sensor signals, including EMG signals, such as heart EMG (ECG) signals and other muscular EMG signals, and movement-induced signals, such as acceleration signals.

The invention suits well for designing distributed performance monitoring systems with sensors grouped in suitable single-sensor units and/or multi-sensor groups each serving for a particular purpose and associated with a single communications module. Although the system is distributed, the amount of physical wiring can be kept reasonable because of wireless communication between the communication modules and the monitoring unit.

Long wires as used in prior art solutions are sensitive to interference, as the EMG voltages are low. With the aid of the invention, robust data transfer between the measuring points and a monitoring unit can be established. Only the wires between the sensors and the distributed mounting zones need to be integrated to the garments, for example. Still, accurate information regarding the relative timing of events detected with the sensors is obtained at the monitoring unit.

The proposed technique is very efficient to implement and increases the amount of computation in the modules only a little compared with a system without time information. The amount of additional data in the wireless messages can also be kept very low.

A single training session typically produces a great amount of data messages which are processed in the receiver to get a "master file" which includes detailed temporal training data from a plurality of sources within the personal-area network of a person. The master file can be processed further in a computer, if desired. It is not necessary to save individual data messages once the relevant data has been extracted therefrom.

Dependent claims focus on selected embodiments of the invention.

According to one embodiment, the communication module comprises conductor means for continuously receiving sensor signals from a sensor connected to the conductor means, and a processing unit adapted to continuously process the sensor signals according to a signal processing algorithm and to form a plurality of successive data messages containing data at least partly derived from the sensor signals using the signal analysis algorithm. The messages are guided to a wireless communication unit for transmitting each of them to an external wireless receiver device at a transmission time slot following the message-forming using a wireless communication protocol. The signal analysis algorithm is capable of detecting predefined characteristic features of the sensor signals and determining first time points of the features. In addition, the processing unit is capable of determining second time points corresponding to the temporal transmission slots for transmitting of data messages corresponding to the characteristic features using the wireless communication unit, and adding information on the difference between the first and second time points to the data messages.

According to one embodiment, the means for receiving the sensor signals and the processing unit are adapted to receive and process electromyographic (EMG) signals form an EMG sensor. This includes also heartbeat EMG (ECG) signals. EMG signals can be used to monitor the activity of different parts of the body during a performance and the present invention allows for monitoring also the synchronization and coordination between different muscle groups, for example, in the performance.

According to one embodiment, the processing unit is adapted to determine the first time points by determining local amplitude peaks in said sensor signals. The time point of a peak amplitude is well defined, easy to mathematically calculate, and represents well not only the moment of heartbeat, but also the timing of other muscle activities.

Alternatives to peak amplitude determination include for example zero point determination and determination of a moment when the amplitude of the signal reaches a predefined threshold amplitude. Irrespective of the method of determination, also other data depicting the signal measured can be determined and included to the messages. Such data include e.g. peak amplitude (signal strength), signal integral over a predefined period, signal slope and signal frequency.

According to one embodiment, the wireless communication protocol is a regularly repeating transmission time slot based protocol. This means that each module has a predefined time slot, i.e., time window, during which it is allowed to transmit data to the receiver. Other modules have different time slots. The receiver is typically a master device, which assigns the slots to the modules when they are initially connected to the system such that all devices transmit at different times. In this embodiment, the processing unit is preferably adapted to determine the second time points, i.e. message time points, using predefined information on the time slot allowed for said communication module to transmit messages. As the receiver is synchronized with the modules, it knows by the time of receipt of a message which module the message is coming from.

According to one embodiment, the processing unit is adapted to detect predefined characteristic features from the sensor signals using a feature detection algorithm coded in the processing unit and to include data relating to each characteristic feature found to the next data message. For example, if a muscle activity of sufficient strength is detected at time T and the next messaging time slot according to the messaging protocol for the module concerned is upcoming at time T+t, the value of t is coded in the message transmitted at that time slot.

According to one embodiment, the module comprises an internal memory unit having an identifier of the communication module stored therein and the processing unit is adapted to include said identifier in at least part of said data messages. This way, the receiver can determine the origins of the messages coming from different modules. It should be noted that once the receiver and the modules are synchronized, the time slot used also indicates the module sufficiently.

According to one embodiment, the modules are capable of not only transmitting data messages, but also receiving data messages from another similar communication modules and relaying said received data messages or at least part of the data contained in the received data messages forward. Preferably the messages are relayed at the time slot assigned for the relaying module. The relayed message can be included as part of the data message of the relaying module or simply transmitted one after another. By relaying, it can be better ensured that all messages reach the receiver, that is, even if the original module and the receiver are too far away from each other for messages to go through but there is an intermediate module within reach of both the first module and the receiver.

In this embodiment, it is usually necessary to include an identifier of the original module to the relayed message so that the receiver knows which module the data in the message relates to. Thus, according to one embodiment, the processing unit is configured to include in the relayed data an identifier of the other similar data module and information on the duration from the time of receipt of the data to be relayed to the time of relaying of said data. The relay duration information is necessary for the receiver to maintain the chronology of the data, since a relayed message has spent more time in the system than a directly received message. These duration information can in practice be included in many ways to the data messages, including adding information on the time of receipt or duration of "stay" of the relayed data in the relaying module, and determining the total duration from origin of the original signal to the transmitting of the relayed message.

According to one additional aspect of the invention, the module comprise means for mounting the communication module to a mounting zone on a sports item, the means for mounting comprising two or more electronic contact terminals (first contact terminals) for making an electronic contact with the sports item while being mounted thereon, and the processing unit is functionally connected to said contact terminals and to said wireless communication unit and capable of processing data received through the contact terminals and/or the wireless communication unit according to data processing instructions. In addition, the communication module comprises means for reading an identifier from the sports item while being mounted thereon, and the processing unit is capable of changing said data processing instructions based on the value of the identifier read from the sports item. This embodiment allows for the module to flexibly adapt its internal operation according to the environment (sports item or sensor) it is attached to. The data processing instructions changed comprise e.g. instructions for the sensor signal analysis algorithm. Thus, by simply mounting the module to different places, its operation can be affected to be optimal for the signal input to the module.

The mounting means of the communication module and the mounting zone of the sports item are preferably designed to allow for repetitive mounting and removing of the communication module(s) thereto/therefrom. Thus, the module can be removed if a person wants to use the module in another sports item or for example during washing of the sports item or charging or changing of a battery of the module.

In one particular embodiment, the number of second electronic contact terminals in the sports item is two and the terminals are connected both to said memory unit and to the one or more sensors. The communication link through corresponding first terminals of the communication module and the second terminals of the sports item is arranged such that signal from/to the memory unit and from the sensor(s) are distinguishable, e.g. by their frequency characteristics, so that both the memory unit and the sensor(s) are useable.

According to a further embodiment, the communication module comprises a memory for storing a set of data processing instructions corresponding to different identifiers and the processing unit is capable of choosing the data processing instructions from said set of data processing instructions based on the value of the identifier read. In a still further embodiment, the processing unit is capable of sending a request for data processing instructions corresponding to the value of the identifier read and receiving said data processing instructions through said wireless communication unit to/from the external wireless device and optionally storing the received data processing instructions in the set of data processing instructions in said memory.

According to one embodiment, the present monitoring device comprises wireless receiver means for receiving a plurality of successive messages from a plurality of communication modules each connected to one or more sensors using the same communication protocol as used by the communication modules, said messages each comprising at least a first data field comprising first data and a second data field comprising second data. The device comprises also processing means capable of extracting from the messages said first data and said second data, means for storing at least part of the first data extracted from said plurality of messages in a chronological order in a data structure based on said second data. The data is preferably stored in one or more files in a memory unit of the device in a suitable data format.

The invention also provides a personal performance monitoring system comprising a plurality of communication units and a monitoring device as described above. The system may additionally comprise one or more sports items with integrated sensors and mounting zones for receiving the communication modules and providing sensor signals to the modules for further processing.

In a preferred embodiment, the system comprises one or more sports garments comprising a plurality of EMG sensors connected to a plurality of mounting zones each comprising means for holding a communication module and contact means for connecting the communication module electrically to at least one of said EMG sensors. In furthers embodiments the one or more sports garments comprises sports pants, shirt or jacket comprising EMG sensors for measuring muscle activity from both legs, arms or midriff. The sensors can be arranged in one, two or more sensor groups each being connected to a separate mounting zone. If there are many mounting zones and modules (including the zones and modules in potential other sports items in the system), a distributed temporal performance monitoring system is achieved.

According to one embodiment, the sports item contains, in addition to a sensor, also analogue and/or digital processing unit, which is capable of processing the sensor data before sending to the contact terminals and further to the communication module. The processing unit typically comprises a microcontroller embedded in the sports item. This embodiment allows for even more generic communication modules to be used, as part of signal processing or intelligent logic operations can be implemented in the sports unit level, as in integral part and function of the sports item. Preferably, the processing unit is powered by the communication module but may naturally contain also a separate power source. In particular, there may be sensor signal A/D conversion and processing logic in a sensor-containing sports item. The processing may be located either in the vicinity of the sensor or in the vicinity of the mounting zone for the communication module. In this embodiment, the identifier may be provided for the communication module a memory of the processing unit, whereby any separate memory unit for storing the identifier is not needed. The signal for the contact terminals of the sports item may contain both the identifier and any additional data from the sensor processed in the integral processing unit. It is also possible to provide a two-way wired communication between the communication module and the integral processing unit of the sports item so that preprocessing instructions, for example, are given for the integral processing unit from the communication module.

The present method allows for determining temporal order of measurable signals corresponding to physical events during a physical performance of a person. One embodiment of the method comprising measuring at least two different performance-related signals at different locations of the body or equipment of the person using at least two different sensors attached to at least two different communication modules, respectively, and transferring messages corresponding to said signals from the communication modules wirelessly to a central monitoring unit. In accordance with the invention, the method further comprises determining time differences between determined features of the signals and said transferring of the messages corresponding to said features and including information on the time differences to said messages. The data in the messages is further processed in the central monitoring unit based on the information on the time differences so as to determine the temporal order of events measured.

In one embodiment, at least one of said performance-related signals is an electromyographic (EMG) signal measured from a body part of the person. The EMG signal may be an electrocardiographic (ECG) signal or a limb muscle EMG signal, for example.

In one embodiment, at least one of said performance-related signals is an acceleration, orientation or position signal measured from a body part of the person or equipment or garment carried by the person.

According to one embodiment, all communication modules in the system, irrespective of their place of mounting, are similar in their hardware design and the operational differences are achieved solely by reprogramming according to the invention based on the identifiers read form the mounting zones.

According to a further aspect of the invention, there are provided sports pants comprising a plurality of integrated EMG sensors adapted to sense EMG signals from at least two leg muscles, such as frontal and/or back thigh muscles, preferably from both legs. There is also provided one or more mounting zones for communication modules as described above, the mounting zones comprising module-readable identifiers. The EMG sensors are connected to contact terminals contained in the mounting zones by wires integrated to the garment structure. The number of mounting zones is typically one (all sensors connected thereto and their signals processed in a module attached thereto) or two (sensors arranged in two groups and their signals processed separately), but may be also larger (more sensor groups).

According to an alternative embodiment, there is provided a sports shirt or jacket comprising an integrated ECG sensor for heartbeat detection and optionally one or more integrated EMG sensors for sensing EMG signals from stomach, back and/or arm muscles, for example. Otherwise, the shirt or jacket is similar to the pants discussed above.

DEFINITIONS

The term "sports item" covers various pieces of garment and other items used when performing sports. In particular, the term covers personal clothing and other wearable items, such as heart rate belts, and personal sports equipment in direct possession of the person performing the sport. The term also covers other sports items that are at least temporarily in the vicinity of the person during the performance, i.e., can join the personal-area network of a central unit (monitoring unit) of the person. An example of such item is a golf bag. Further examples are given in the detailed description. "Sports" should be taken broadly to cover all kinds of physical activities.

"Message" is a typically digital data structure which is capable of carrying encoded data can be wirelessly sent from a wireless communication module to a wireless receiver in which the data can be extracted. The messages may contain several data fields with a field identifier (tag) and field value. Of particular use within this invention are timing data fields with an indicator of a delay from signal time-to-messaging time and optional data fields with other information on the signal (e.g. signal amplitude).

"Processing a sensor signal" covers all actions made by the communication module on the sensor signal for forming a data message based on the signal. Examples of processing actions include amplification, A/D conversion, and digital signal analysis, such as feature detection.

"First time point" refers to a moment of time determined by the communication module by processing the sensor signal. Typically, the first time point is determined using digital signal analysis and a signal analysis algorithm designed for a particular sensor type.

"Second time point" refers to the moment of transmitting sensor data-containing messages from a communication module to a receiver. Since the duration of the message (and messaging time slot) is typically short compared with the messaging delay (time from first time point to second time point) and all modules use the same setting, it is not relevant whether the second time point is set to be at the beginning or end of the message or between these ends. Essential is, however, that each module knows beforehand the upcoming time of at least the next messaging time slot.

"Mounting zone" is zone on a sports item dedicated or at least suitable for a communication module according to the invention. A mounting zone comprises both physical and electronic connection means for the communication module to both remain attached to the sports item and to be able to electrically communicate with one or more sensors of the sports item.

"ID" or "identifier" in a sports item is a piece of machine-readable data which indicates the type of the sports item in particular in respect of number and type(s) of sensor(s) and/or actuator(s) therein for allowing a communication module attached to the mounting zone to utilize them. The identifier can be coded in any suitable machine-readable format encoding a specific value. Therefore, references to the "identifier" can be considered as references to the "value of identifier", where applicable. The identifier can for example be a sequence of characters bit-encoded stored in a semiconductor memory unit.

"Processing instructions" means computer-readable code (typically arranged in a single data file) with data content, which can be interpreted by the communication module to change its operation to correspond with the requirements of a sports item with a specific ID. The instructions may have effect for example on
  sensor signal (input signal) processing characteristics (e.g. amplification characteristics) of the module,
  internal sensor data processing algorithms,
  data interface specifications with a sensor, and/or
  wireless data communication characteristics with a monitor unit.

The processing instructions may comprise a set of configuration values (passive instructions), computer-executable code (active instructions), or both, in a suitable data structure, most commonly in one or more data file. Thus, the processing instructions are sports item—specific software configuration files or applications, which can be utilized or run by the operating system (firmware) of the module.

"Monitoring" means receiving information on the performance using one or more sensors in one or more sports items through one or more communication modules according to the invention. Monitoring is preferably carried out using a wearable monitoring unit, such as a wristop computer, but may be done also using any other computing device capable of communicating with the one or more communication modules. One option is to use a mobile phone as the monitoring unit.

Next, embodiments of the invention and advantages thereof are described in more detail with reference to the attached drawings.

DETAILED DESCRIPTION OF EMBODIMENTS

Figure 1A:
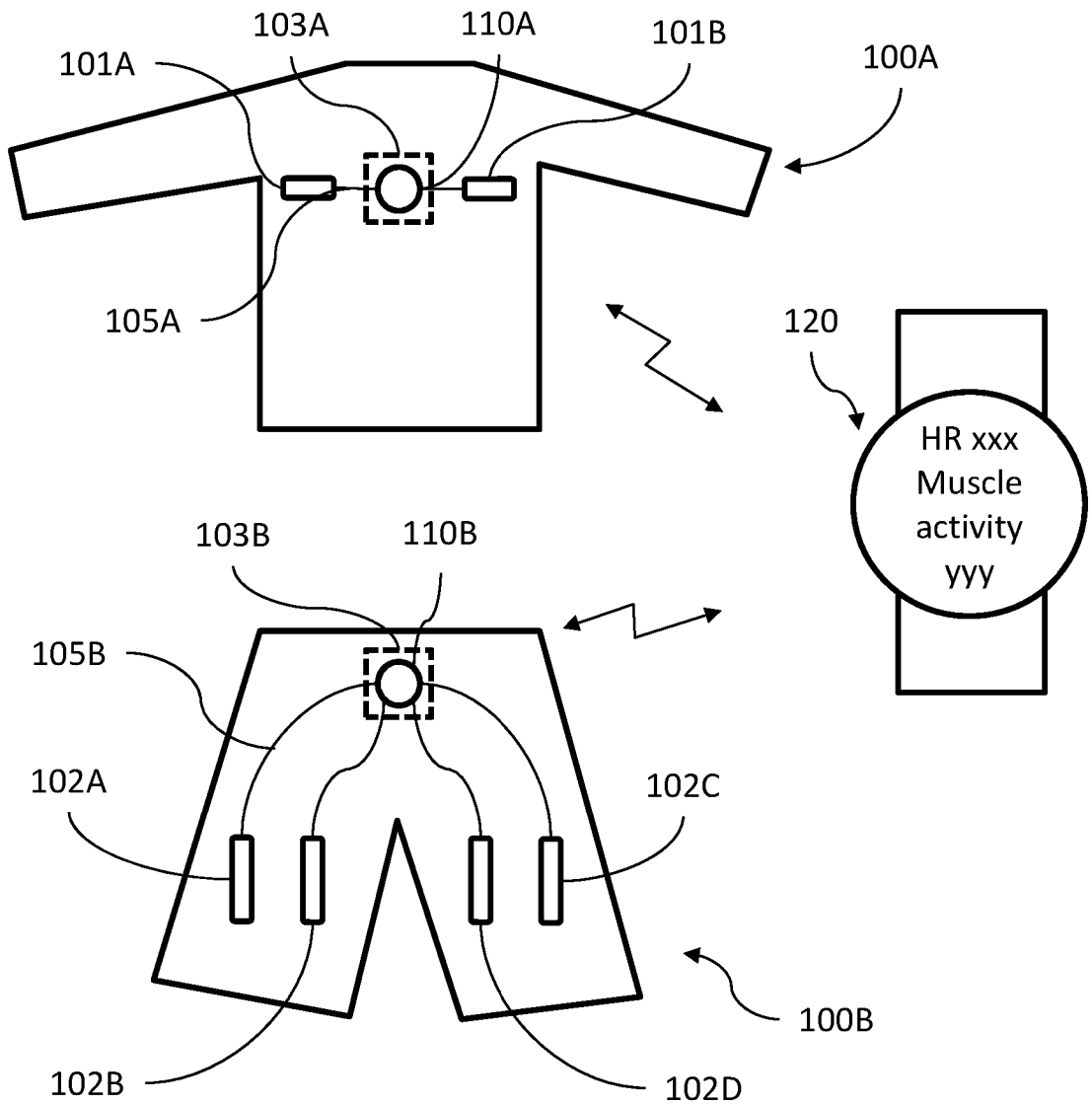
FIG. 1A illustrates a monitoring system according to one embodiment of the invention with communication modules attached to sports garments with integrated EMG sensors.

FIG. 1A shows one example of a system that can take advantage of the invention. The system comprises a first sports garment (shirt) 100A and a second sports garment (shorts) 100B, both containing integrated EMG sensors. The shirt 100A comprises first EMG sensor pads 101A, 101B positioned to measure heart EMG signal. In the shorts 100B, there are second EMG sensor pads 102A-D are positioned in two groups (102A and 102B/102C and 102D) against both thighs to measure thigh muscle EMG activity. The heart EMG pads 101A, 101B are connected to a first mounting zone 103A in the shirt 100A using first wirings 105A. Similarly, the thigh muscle activity EMG pads 102A-D of the shorts 100B are connected to a second mounting zone 103B in the shorts using second wirings 105B.

To the first and second mounting zones 103A, 103B, there are attached a first and a second communication module 110A, 110B, such that they are electrically connected to the first and second wirings 105A, 105B and further to the first and second EMG sensor pads 101A-B, 102A-D, respectively.

Although discussed here as a modular system, i.e. with releasable and re-mountable communication modules, the communication modules may also be integral parts of the sports garments.

The communication modules 110A, 110B are capable of detecting and processing EMG signals provided by the EMG pads 101A-B, 102A-D. The processing may comprise amplification, A/D conversion and analysis steps. The analysis step may comprise signal characteristic point, such as peak point, detection according to a detection algorithm stored in the processing units of the communication modules. In particular, the (absolute or relative) time of the characteristic point is recorded. If the analysis is carried out essentially real-time with signal acquisition, the time of the characteristic point is essentially the time of detection. If a plurality of sensors are connected to a single unit, as in the case of shorts 100B (EMG from both legs measured separately), the analysis is carried out for both sensor signals separately. The data from each sensor may be sent as separate messages or integrated into a single message.

The communication modules 110A, 110B are also configured to determine the time point of transmission of a message relating to the characteristics detected and to code the time difference between the time of detection and time of transmission (i.e. time stamps) into the message to be transmitted, along with desired data on the signal itself. In some applications, such as heartbeat detection, only the number of heartbeats is essential, whereby the message may contain only the time stamps of the heartbeats, or only the number of beats since last transmission. In other applications, such as muscular activity measurement by EMG, also other signal properties, such as the magnitude and/or duration of the EMG signals is of interest and is preferably coded in the messages with respective time stamps. If a plurality of sensors are connected to a single unit, their data and time stamps may be included in a single message, if desired.

There is also provided a monitoring unit (wristop computer) 120, to which the communication modules 110A, 110B wirelessly transmit the messages formed in the above-mentioned manner, i.e. the desired measurement information and time stamps received from the sensors after processing in the processing units of the communication modules 100A, 100B. The monitoring unit 120 receive the messages and process their contents so as to determine the temporal order of the signals of from the different sensors.

According to one embodiment, both mounting zones 103A, 103B comprise communication module-readable identifiers, which are read by the communication modules 110A, 110B to be able to adapt the communication modules for these particular measurement environments. Thus, the modules 110A, 110B can be identical in hardware and firmware but can change their internal operating instructions to co-operate in the best possible way with the sensor devices and/or monitoring unit they are connected to. Parameters that are potentially affected by the adaptation include e.g. amplification characteristics of the sensor signal, processing algorithms of the sensor signal and communication channel characteristics between the module with the monitoring unit.

The monitoring unit 120 may serve to provide the operating instructions for the modules 110A, 110B based on the identifiers read by the modules 110A, 110B upon request by the modules 110A, 110B. The request and transmitting the instructions are preferably also done through wireless communication. Alternatively, the instructions corresponding to the identifiers may be stored in the modules 110A, 110B, whereby no communication with the monitoring unit 120 at the adaptation phase is needed.

To give an example of adaptation of the modules, the identifier of the shirt 100A can "tell" the module 110A that there is one sensor (two pads) of EMG type connected and that the signal amplification level required is X. The identifier of the shorts 100B can "tell" the module 110B that there are two sensors (four pads) both of EMG type connected and that signal amplification level required for both of these is Y. As indicated above, the "telling" may take place through internal-only adaptation (instructions pre-stored in the module) or through communication with another device, such as the monitoring unit, a computer or a cloud service.

Figure 1B:
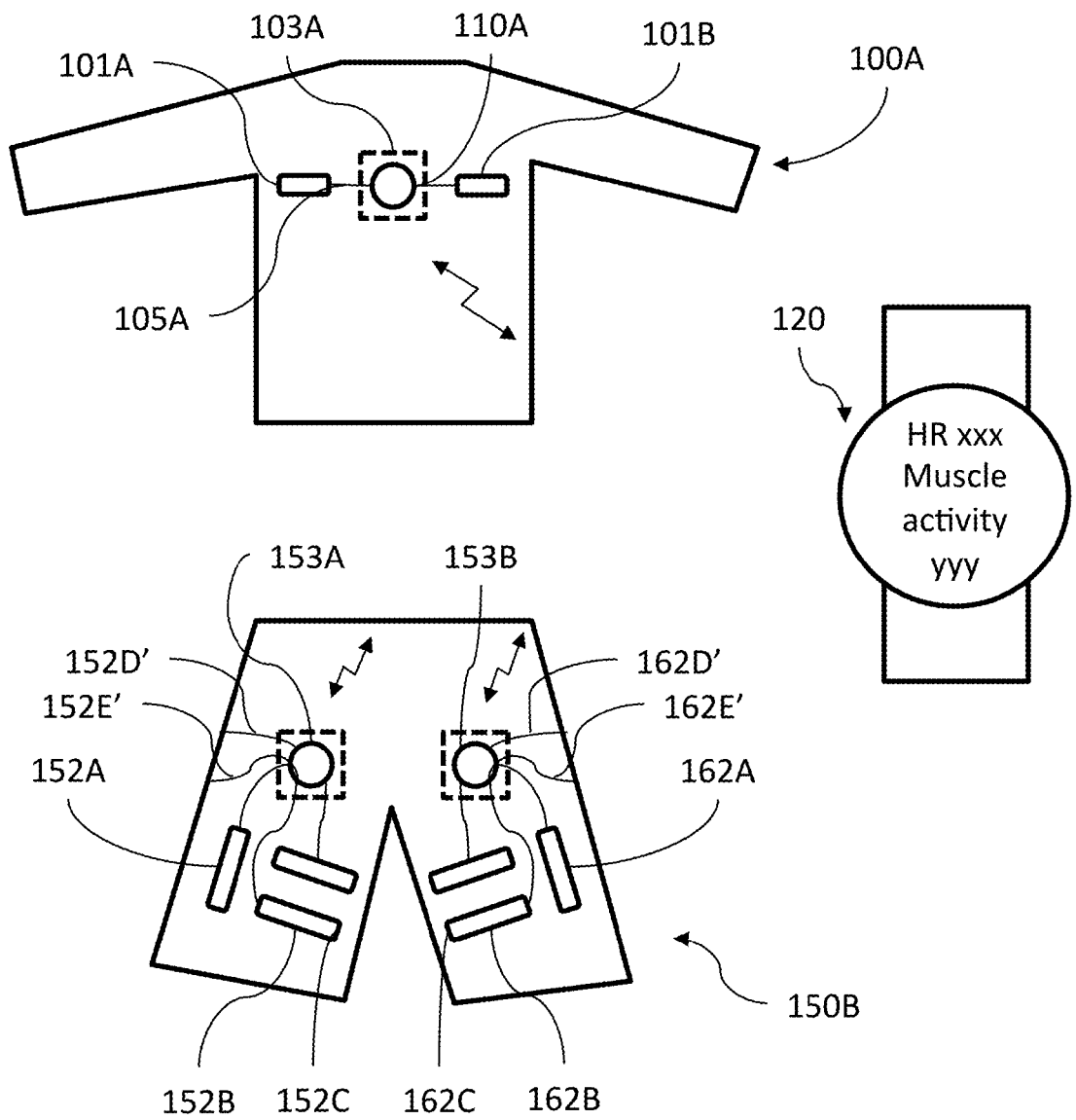
FIG. 1B illustrates a monitoring system according to another embodiment of the invention utilizing EMG sensors integrated with sports garments.

FIG. 1B illustrates a system otherwise similar to that of FIG. 1A but with the shorts 150B designed in an alternative way. The shorts 150B comprise mounting zones 153A, 153B for communication modules separately for each leg. The mounting zones 153A, 153B are connected to EMG sensors 152A-C, 162A-C arranged on each leg, respectively. The illustrates sensors 152A-C, 162A-C are located on the front and side portions of the legs and connected to the mounting zones 153A, 153B with suitable wirings integrated to the garments but there may be one or more additional sensors (not shown) on the back sides of the legs, again connected with wirings 152D', 152E', 162D', 162E'. Thus, a complete muscular activity sensing system for each large muscle group and each leg is formed. Combined with the ECG signal from the subsystem of the shirt 100A, a comprehensive performance monitoring system is obtained.

Instead of two separate mounting zones 153A, 153B and respective identifiers therein at the pants 150B, there may be only one mounting zone or even more mounting zones. The illustrated sensor grouping is made only to exemplify the possibilities of the invention.

By means of the embodiments illustrated in FIGS. 1A and 1B, EMG messaging electronics can be distributed close to the place of measurement and the need of long wirings is avoided, without losing information on the temporal order of the measured events. Each wireless module is designed according to the invention to provide time synchronization enabling data on the events measured by the related sensor(s). This allows one to manufacture advanced sports monitoring shirt and pants, for example, as separate entities (instead of a combined whole-body item) and without clumsy wire connectors between them.

Figure 2A:
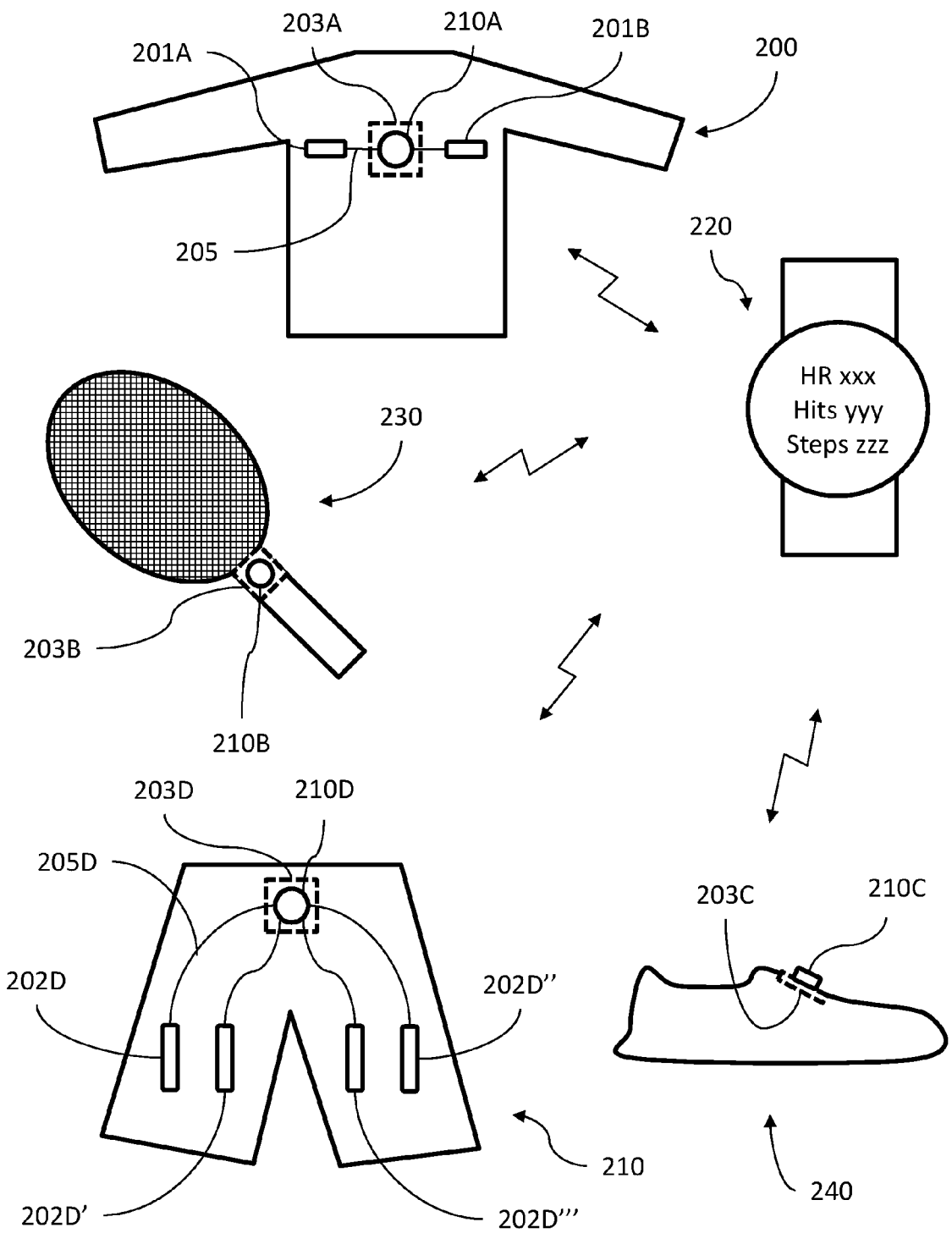
FIG. 2A shows another exemplary monitoring system with communication modules attached to two pieces of garments with an integrated EMG sensor, tennis racket and shoe.

FIG. 2A shows a modified exemplary system with sports garments 200 and 210 corresponding to the garments 100A and 100B of FIG. 1A, respectively. The EMG pads are denoted with reference numerals 201A-B and 202D-D''', the first mounting zone with 203A and 203D, wirings with 205 and 205D and the first communication module attached thereto with 210A and 210D. If desired, the mounting zones 203A, 203D may comprises a respective identifiers readable by the modules 210A, 210D.

In addition, there is provided a tennis racket 230 with a second mounting zone 203B and a second communication module 210B and a sports shoe 240 with a third mounting zone 203C and a third communication module 210C. The mounting zones 203B, 203C of the racket 230 and shoe 240 may be connected to acceleration sensors, orientation sensors or position sensors, to mention some examples, so as to be able to communicate corresponding acceleration, orientation or position information to the communication units 210B, 210C and further to the monitoring unit 220.

Similarly to the situation with EMG sensors, the communication modules 210B, 210C are also configured to processing the sensor signals, comprising e.g., amplification, A/D conversion and analysis steps. In this case too, the analysis step preferably comprises detection of characteristic points of the signal, such as peak points, using a detection algorithm stored in the processing units of the communication modules. In particular, the (absolute or relative) time of the characteristic point is recorded. In addition, to communication modules determine the time point of transmission of a message relating to the characteristics detected and code the time difference between the time of detection and time of transmission into the message to be transmitted, along with desired data on the signal itself. Thus, the chronological order of the EMG, acceleration, position and/or orientation signals can be determined by the monitoring unit receiving messages of the respective modules.

According to one embodiment, the mounting zones 203B, 203C also contain respective identifiers readable by the modules 210B, 210C to indicate what kind of operation of the communication modules 210B, 210C are required, as discussed above with reference to the systems of FIGS. 1A and 1B.

It is also possible that the racket 230 and/or shoe 240 are not provide with any sensors connected to the mounting zones 203B, 203C. In that case, their identifiers may "tell" the modules 210B, 210C that an internal sensor, such as an acceleration sensor, of the modules 210B, 210C are to be used. In this case, the identifiers can also be "void". In other words, if a module is not able to find any identifier with specific data content (identifier code), it assumes by default to operate in a particular way, typically using its internal sensor and corresponding pre-stored processing instructions for usage of the internal sensor.

The sports items 100A, 100B, 200, 210, 230 and 240 are preferably passive, i.e., are not provided with own power sources. Instead of that, the power for both identifier-reading and sensor operations is obtained from power sources contained in the communication modules 110A, 110B, 210A, 210B and 210C.

The present modules can be used in connection with any sports items within the personal-area network of a person. Examples are pieces of garment carried out by the person, such as shirts, trousers, socks, hats, caps, footwear, handwear and belts and various pieces of sports equipment necessary for any particular sports, including rackets, bats, clubs, sticks, skis, bicycles, balls, vehicles, and bags.

Examples of sensors contained in the sports items include the EMG, acceleration, orientation, position sensors already mentioned above, and additionally temperature and pressure sensors, such as air pressure sensors or tactile sensors, and photosensors. Specific sensor types for the abovementioned purposes include conductive electronic potential sensors, micromechanical acceleration sensors, micromechanical gyroscopic sensors, micromechanical magnetic sensors, micromechanical pressure sensors, satellite positioning system sensors (e.g. GPS or GLONASS), resistive and capacitive touch sensors (with optional touch position and/or touch force detection capability) and digital imaging sensors (e.g. multipixel CCD or CMOS sensors).

Specific sports item examples include heartbeat ECG belts, muscular EMG belts or garments and tennis rackets, golf clubs, skiing equipment with acceleration sensors or orientation sensors and photographic devices used during the performance.

Figures 2B, 2C:
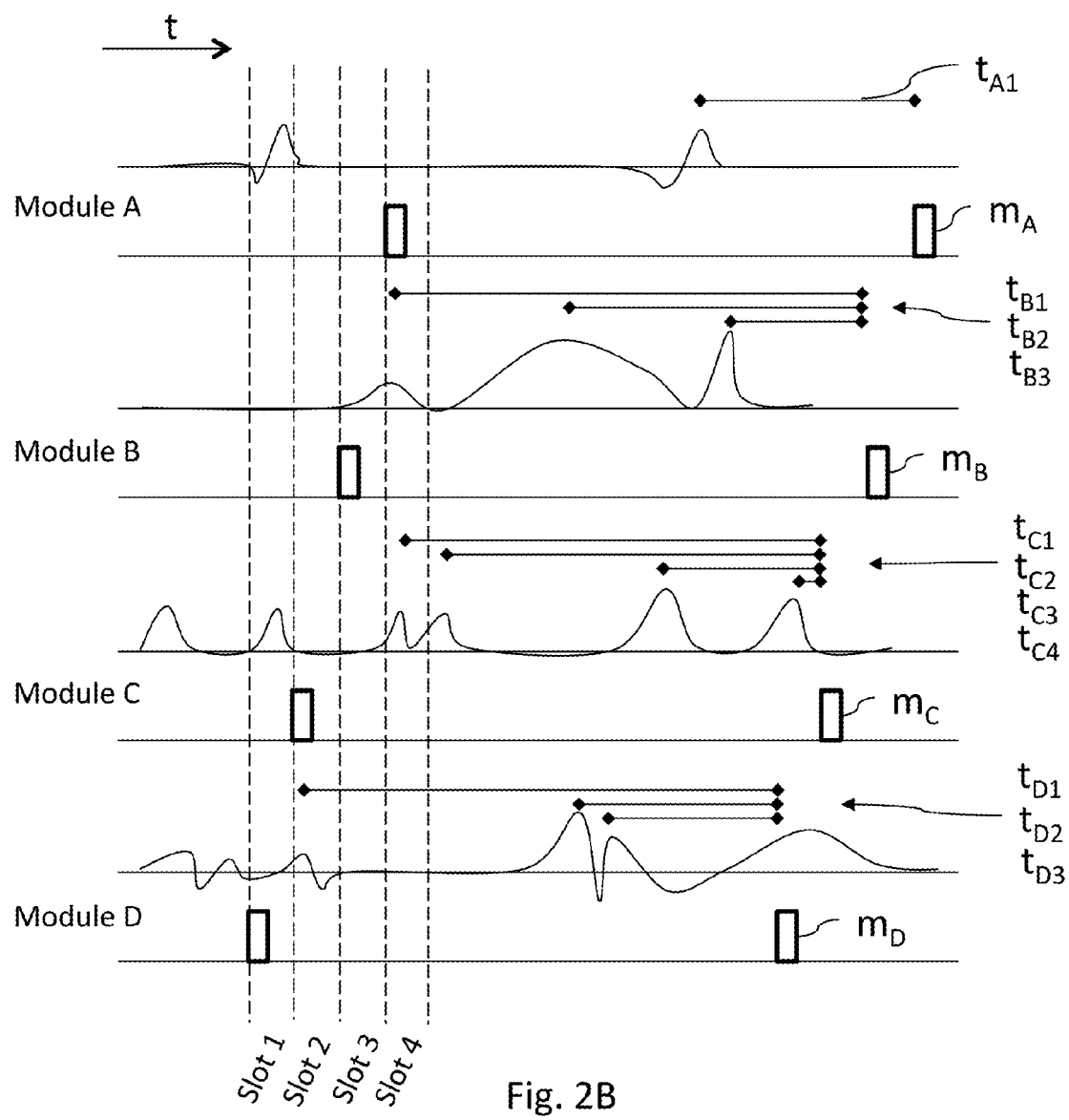
FIG. 2B shows a graph of an exemplary messaging scheme with the system of FIG. 2A according to one embodiment of the invention.
FIG. 2C shows a table depicting an exemplary master file created in a monitoring device receiving the messages shown in FIG. 2B from the communication modules of FIG. 2A.

FIG. 2B illustrates as a chart the sensor measurement, signal processing and messaging scheme in the exemplary system of FIG. 2A. The chart exhibits time t on the horizontal axis and sensor signals and module-to-monitoring unit messages for each of the modules A, B, C and D of FIG. 2A separately. Looking first on the messaging scheme, the exemplary protocol used for communication between the modules and the monitoring unit is a time slot-based protocol. This means that a separate time window (slot) for message transmission is assigned for each of the modules. The cycling of successive time windows is illustrated by Slots 1-4 in FIG. 2B (Module D has been assigned Slot 1 . . . . Module A has been assigned Slot 4). The monitoring unit listens over the Slots 1-4 to receive messages from each of the modules A-D. Once all slots have been gone through, the cycle repeats.

Looking next on the sensor signals and in particular the latter of the two messaging cycles shown in FIG. 2B, each sensor provides a sensor signal depending on the type of sensor and activity to be measured. For example the sensor coupled to Module A is a heartbeat EMG sensor and therefore provides a relatively regular signal at every heartbeat, whereas the acceleration sensor in the racket with Module B provides an irregular signal according to the movement of the racket and so on. In this example, local highs (peaks) of the signals that take place after the last message transmission of the module concerned (i.e. all peaks that have not yet been reported to the monitoring unit) are determined and their time points recorded (cf. left ends of horizontal timelines $t_{XY}$, where X is a module identifier A, B, C, D and Y is a peak identifier 1, 2, 3, 4). In addition, the time points of next upcoming transmissions of messages $m_A$, $m_B$, $m_C$, $m_D$ are determined (cf. right ends of the horizontal timelines $t_{XY}$). The time $t_{XY}$ elapsed between these time points is coded in the corresponding messages $m_A$, $m_B$, $m_C$, $m_D$.

Based on the scheme illustrates in FIG. 2B, a monitoring unit capturing all the messages $m_A$, $m_B$, $m_C$, $m_D$ transmitted by the modules A-D is able to arrange the peaks of the signals in chronological order, some of which are shown in the form of a table with exemplary arbitrary values in FIG. 2C. The key to the capability of arranging the signals is the time information $t_{XY}$ determined by the communication modules and contained in the messages $m_A$, $m_B$, $m_C$, $m_D$.

The signal processing scheme may also be different than illustrated above and naturally different for each sensor type and/or measurement point and/or expected signal characteristics. For example, instead of or in addition to peak determination, the module may be arranged determine zero points of the signal, starting or ending points of the signal, predefined threshold level crossing points of the signal, duration of the signal, integral of the signal over time, slope of the signal, frequency of the signal and so on. The invention is particularly suitable for signals having clear characteristic points, such as the heartbeat signal, limb muscle EMG signals, and acceleration signals from limbs and sports equipment. If the sensor is a digital imaging sensor, the point of interest is the moment of imaging, i.e. the formation of the photosignal at the imaging sensor.

Figure 3:
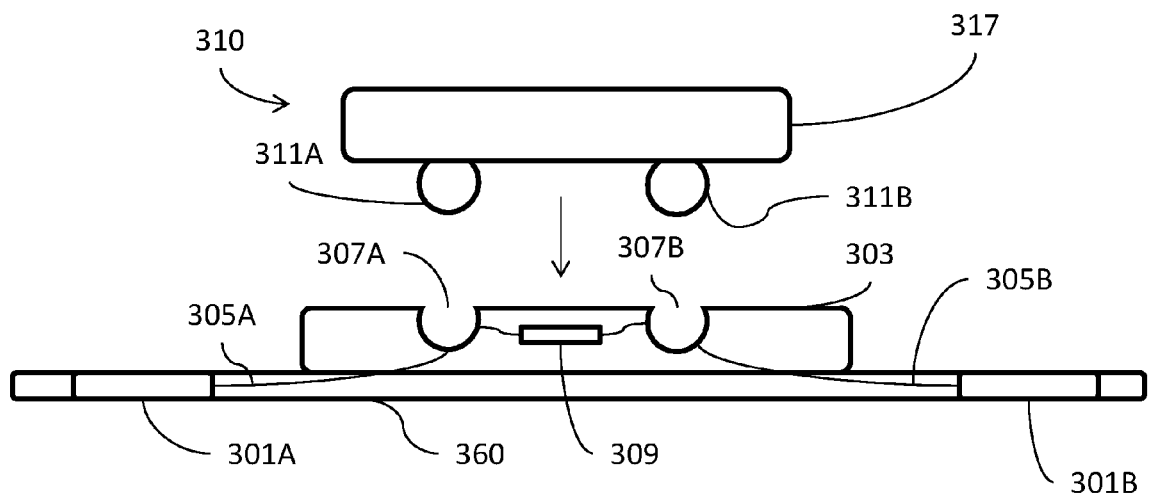
FIG. 3 shows a schematic side view of a communication module and mounting zone on a sports item.

FIG. 3 illustrates two key components of a modular system according to a preferred embodiment of the invention. These are the communication module 310 and sports item 360. The communication module 310 comprises a housing 317 and two electric contact terminals 311A, 311B on outer surface of the housing. In this example, the contact terminals 311A, 311B are in the form of bumps or buttons capable of being snapped into suitable recess counterparts 307A, 307B of a mounting zone 303 of a sports item 360 to provide both attachment and electric connection. There may also be provided separate or additional means to take care of these functions.

In the mounting zone 303, there is provided an identifier memory unit 309 electrically connected to the counterparts 307A, 307B. Thus, when the module 310 is connected to the mounting zone 303, it is able to access the memory unit 309 and read the identifier stored therein. In this example, the counterparts 307A, 307B are additionally connected to EMG sensor pads 301A, 301B using suitable wirings 305A, 305B in the sports item 360 to provide an EMG signal to the module 310.

The memory unit may comprise a memory circuit suitable interface circuit. A memory read command can be sent from the module to the interface circuit to read the identifier. The module may distinguish between identifier data and sensor input data by frequency characteristics of the signals.

As an alternative to the illustrated wired identifier memory unit reading, the reading may take place wirelessly. For example, there may be a radio-frequency identification (RFID) tag, such as a near-field communication (NFC) tag embedded in the mounting zone and the module contains a corresponding RFID/NFC reader unit for reading the identifier. In this case, the contact terminals of the module serve for sensor signal reading only.

Figure 4:
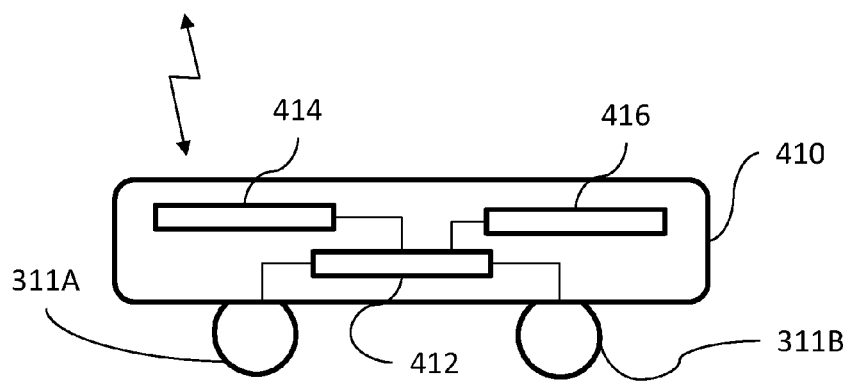
FIG. 4 shows a schematic block diagram of a communication module according to one embodiment of the invention.

FIG. 4 shows in more detail the main internal components of a communication module 410 according to one embodiment of the invention. The module 410 comprises a processing unit 412 which controls and processes the input and output of the module via a wireless communication unit 414 (to and from a monitoring unit) and the contact terminals 311A, 311B (towards an identifier and sensor in a sports item). There may provided a separate input and/or output unit (not shown) between the processing unit 412 and the contact terminals 311A, 311B, the input and/or output unit comprising necessary circuits for amplification of the input signals, if needed.

The processing unit 412 typically comprises a microcontroller operated by firmware, and an amount of memory. There may also be a separate memory circuit (not shown) for storage of larger amounts of data. Tasks of the processing unit 412 include performing internal data processing actions of the communication module 410 and controlling communication to/from the monitoring unit and the sports item the module is attached to. The data processing actions include in particular the sensor signal processing actions required for determining the time stamps for the messages transmitted, as described above. Instructions for the data processing are potentially adaptively selected on the basis of the ID read from the sports item, as described above.

The communication unit 414 comprises an antenna and necessary electronics for amplification of the received and transmitted signals and for coupling with the processing unit 412. The communication unit 414 can utilize any desired wireless communication protocol. The protocol is preferably a time slot-based protocol. Examples of suitable protocols include like Bluetooth LE and ANT+, using direct-sequence spread spectrum (DSSS) modulation techniques and an adaptive isochronous network configuration, respectively. A thorough description of the necessary hardware for various implementations is available e.g. from the Texas Instrument®'s handbook "Wireless Connectivity" which includes IC circuits and related hardware configurations for protocols working in sub-1- and 2.4-GHz frequency bands, such as ANT™, Bluetooth®, Bluetooth® LE (low energy), RFID/NFC, PurePath™ Wireless audio, ZigBee®, IEEE 802.15.4, ZigBee RF4CE, 6LoWPAN, Wi-Fi®, GPS.

For example, in the case of Bluetooth LE, an Attribute Profile (ATT) wire application protocol is used. An attribute is composed of three elements:
  a 16-bit handle;
  an UUID which defines the attribute type;
  a value of a certain length.

A handle is a number that uniquely identifies an attribute and is expected to be stable for each device. A UUID (universally unique identifier) is an identifier standard used in software construction to enable distributed systems to uniquely identify information without significant central coordination. The value is an array of bytes of any size. The meaning of the value depends on the UUID.

Also TDMA-based protocols may be used, as discussed in "TDMA Protocol Requirements for Wireless Sensor Networks", Sensor Technologies and Applications, SENSORCOMM'08. Second International Conference on 25-31 Aug. 2008, Pages 30-35, ISBN:978-0-7695-3330-8.

The module is powered by a power source 416, most typically a battery. There are also means (not show) for charging or allowing for changing the battery.

Figure 5:
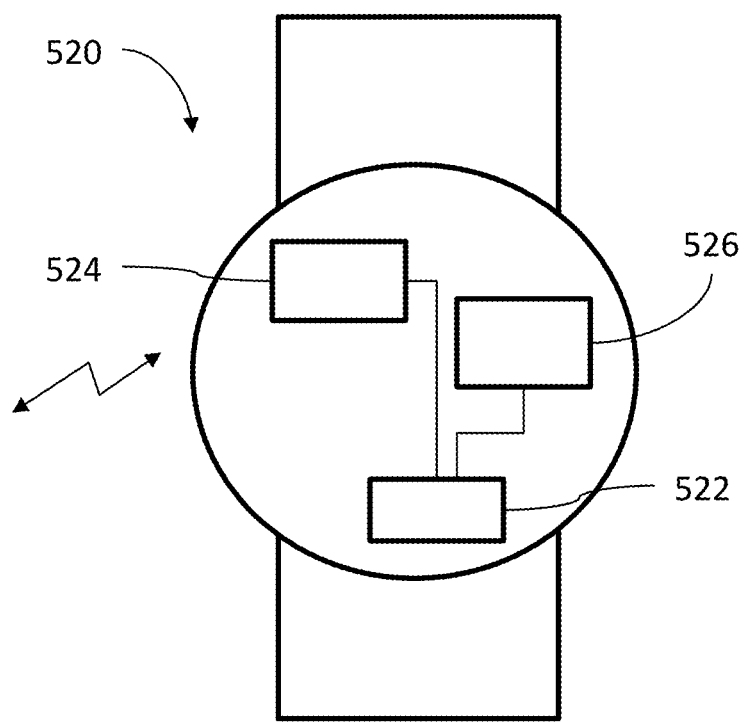
FIG. 5 illustrates a schematic block diagram of a monitoring unit according to one embodiment of the invention.

FIG. 5 depicts a monitoring unit 520 in the form of a wrist-worn computer. Also the monitoring unit comprises a processing unit 522 and a communication unit 524 for communication with one or more modules of the kind described above. There is also provided a memory unit 526 for storage of received/to-be-transmitted data. The communication unit utilizes the same wireless communication protocol as the communication modules(s) it is intended to communicate with. The protocol is preferably a time slot-based protocol. Examples of suitable protocols include Bluetooth LE and ANT+.

One task of the processing unit 522 of the monitoring unit 520 is to collect messages sent by communication units in the same personal-area network and to display and/or store relevant information form the messages to the user via a display or to the memory unit for further use. According to one embodiment, the processing unit picks form the messages data measured by the remote sensors and information on the time of the measurements and orders the measurement data in a chronological order in one or more data structures.

The monitoring unit 520 is powered by a power source, typically a battery. There are also means (not show) for charging or allowing for changing the battery.

Figure 6:
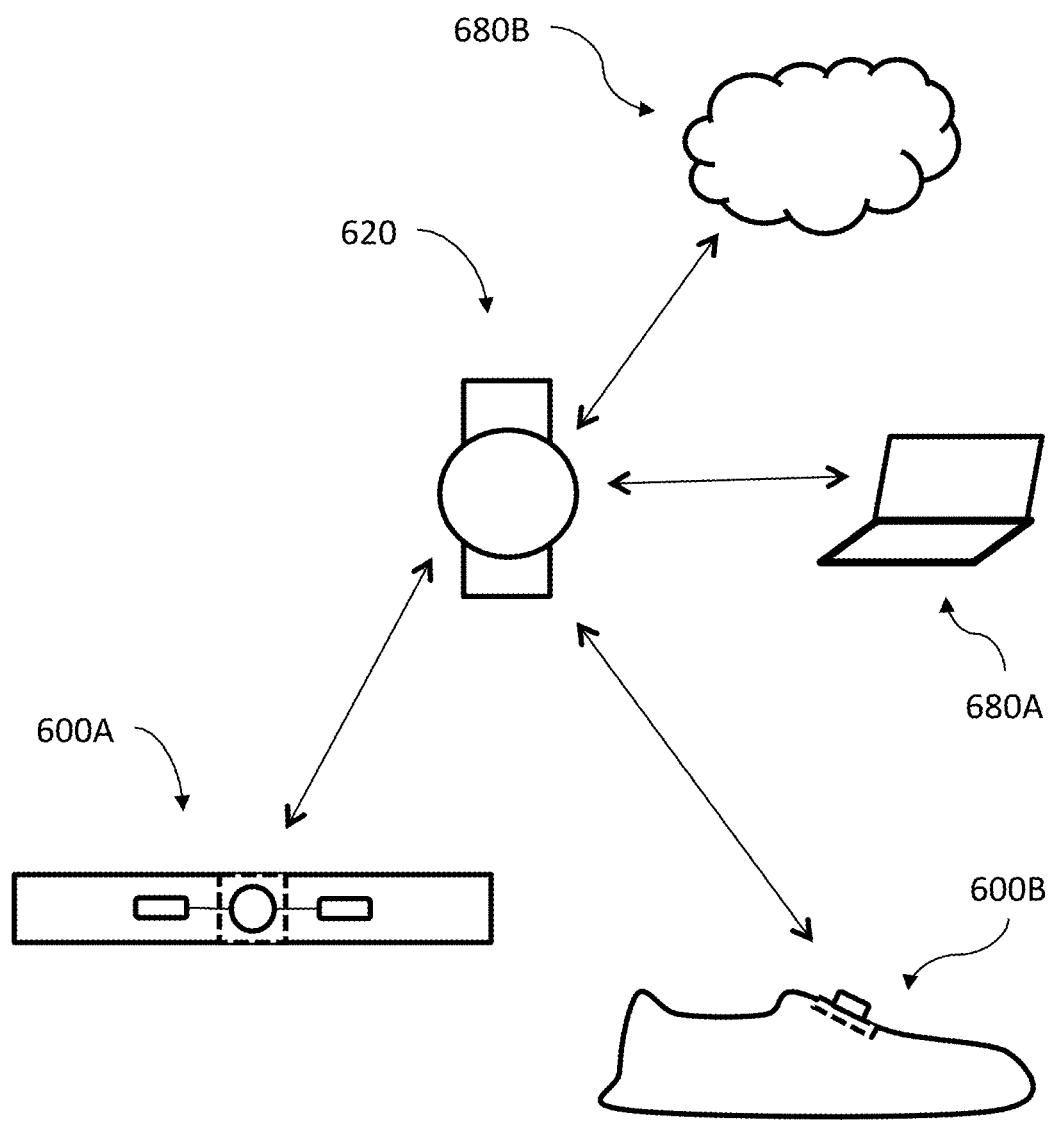
FIG. 6 illustrates a system extended from the monitoring unit to external devices or cloud services.

FIG. 6 shows a variation of the present system, extended from the monitoring unit 620 to cloud services 680B over the internet and/or to an external computer 680A. Connection from the monitoring unit to the internet cloud service 680B is preferably wireless, using e.g. the WLAN or mobile internet protocols. Connection to the computer 680A may be wireless or a cable connection.

One purpose of the extension is to share the measurement data messaged from the sports items 600A and 600B to the monitoring unit 620 further to the computer 680A or cloud service 680B. The processing of the data into the chronological order may take place either in the monitoring unit 620, computer 680A or cloud service 680B.

Another potential purpose of the extension is to provide processing instructions to the communication modules of the sports items 600A, 600B connected to the system, even in the case when the communication modules themselves or the monitoring unit does not initially contain processing instructions corresponding to the ID read from the ports items. In that case, the monitoring unit 620 can make a further request for correct processing instructions to the computer 680A and/or the cloud service 680B.

The processing instructions are preferably stored in and/or provided to the communication module as stand-alone applications, which can be run by the operating system (firmware) of the module. This allows for very generic modules still suitable for a variety of uses to be manufactured.

Figure 7:
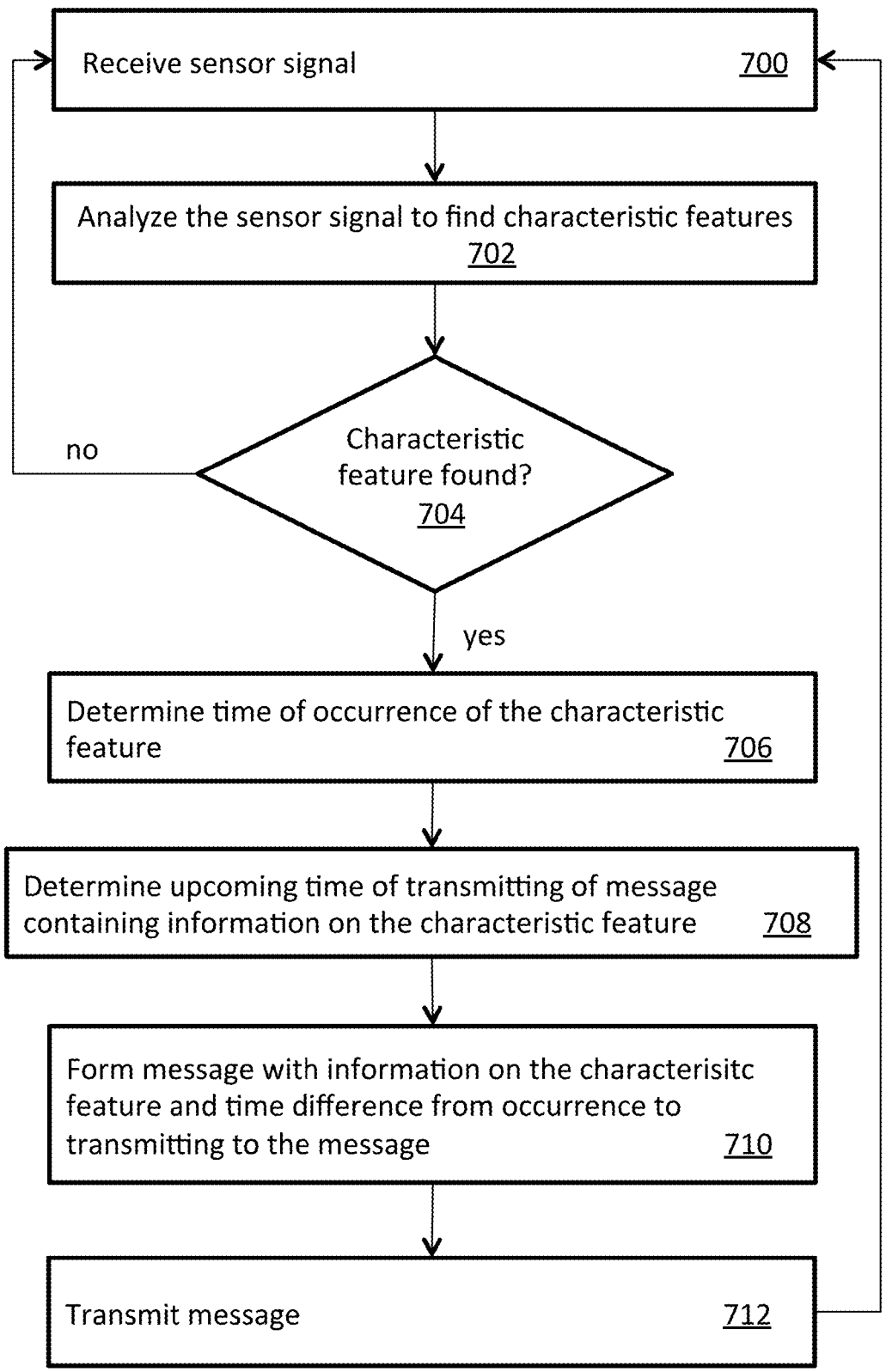
FIG. 7 shows a flow chart of the present method run by a communication module according to one embodiment.

FIG. 7 shows a flow chart of the present method according to one embodiment. First, in step 700, the communication module receives a sensor signal from a sensor. In step 702, the module analyzes the sensor signal in order to find a characteristic feature (e.g. peak of an EMG signal). Signal measurement and analysis process continues in the background all the time. When the module finds a characteristic feature (step 704), it determines its time of occurrence in step 706. In a real-time process, the time of occurrence is the present time. Next, in step 708, the module determined the next time slot available for it to transmit data relating to that feature. In step 710, the module forms a message to be transmitted, including desired features of the signal and the time elapsed from signal to transmission. In step 712, the module transmits the message. The process is repeated for each relevant signal or feature found.

Figure 8:
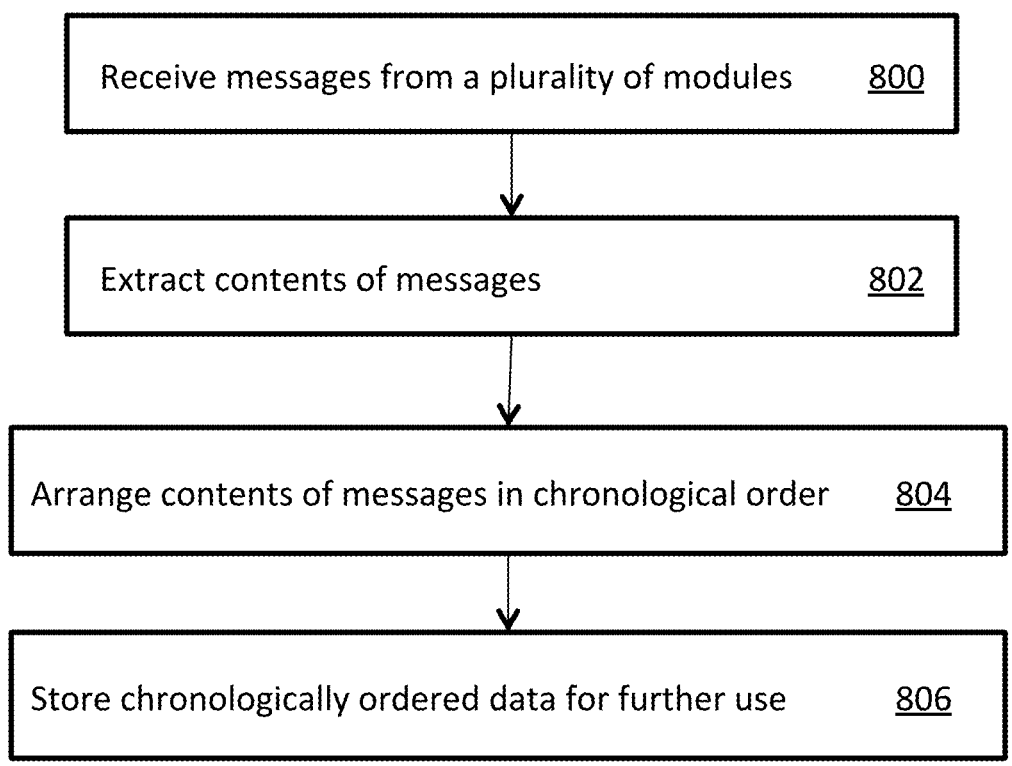
FIG. 8 shows a flow chart of the present method run by a monitoring unit according to one embodiment.

FIG. 8 illustrates the process from the viewpoint of the receiver of the messages, i.e. the monitoring unit. In step 800, the unit receives messages from a plurality of modules operating in the way described above. In step 802, the monitoring unit extracts the relevant data content of the messages and continues to arranging the data in chronological order in step 804. Finally, in step 806, the data is stored on a memory device for further use.

According to one embodiment, the communication modules are capable of listening to messages of other modules and relaying the messages or predefined data contained in the received messages forward to a central receiver device. The time stamp information in the relayed messages or data has to be changed or supplemented accordingly to take into account the additional time of the data spent in the intermediate relaying module. This embodiment can be used to for chains of modules and to ensure successful data communication from modules not able to directly communication with the receiver. In this and preferably also in the other embodiments discussed above, each piece of data or message preferably contains information on the identifiers of the sensors and/or modules the data is coming from.

As briefly discussed above, according to one embodiment, not only the communication module but also the sports item contains a digital processing unit, which is capable of processing the sensor data before sending to the contact terminals and further to the communication module. Thus, at least part of the sensor signal processing, signal analysis and/or message formation can be implemented in the sports item level. For example, the processing unit of the sports item may be adapted to convert a sensor signal from analogue to digital form. Optionally, the processing unit may further execute an algorithm to determine characteristic features of the signal. In this embodiment, the message formation is still carried out in the communication module.

To give another example with even more data processing moved from the communication module to the sports item, the communication module can provide signal transmission slot timing information for the processing unit of the sports item, which is adapted to collect sensor data up to a certain point before the next transmission time slot and, to analyze it locally using an algorithm implemented in the unit, and to form a message for the communication module to transmit further wirelessly. As a sensor or sports item identifier is also preferably provided in the sports item itself, the identifier can also readily be added to the message. It should be noted that only a few examples are described here and the signal processing and analysis and message formation can be divided between the units in a versatile manner also in many other ways.

According to one embodiment, the present system wireless system comprises a wireless digital camera, mobile phone or the like device, which is capable of forming compatible data messages and communicating with the monitoring unit using the same communication protocol as the other sports item(s) in the system. The device comprises internal wireless communication unit, whereby a separate communication module according to the invention in not needed. The camera or mobile phone may communicate any data measured, received or formed therein to the monitoring unit and add corresponding time stamps to the data messages transmitted. The data may be e.g. a digital image or video clip taken with the device and the time stamp contains information on the temporal difference between the imaging moment and transmission time slot reserved for the device to send the data. If a mobile phone is used as the monitoring unit and a data-capturing device, no message-forming and in particular no wireless transmission is required for the captured data, but required processes may be carried internally in the mobile phone.

The invention claimed is:

1. A communication module for monitoring physical performance, comprising
   means for continuously receiving sensor signals from a sensor connected to the communication module,
   a processing unit adapted to continuously process the sensor signals and to form a plurality of successive data messages containing data at least partly derived from the sensor signals, and
   a wireless communication unit for transmitting the formed data messages to an external wireless receiver device at a plurality of successive transmission time slots using a wireless communication protocol,
   wherein the processing unit is adapted to:
      execute a sensor signal analysis algorithm so as to determine first time points based on predefined characteristics of the sensor signals,
      determine second time points corresponding to the temporal transmission slots for transmitting of data messages corresponding to said characteristics using the wireless communication unit, and
      add information on the difference between the first and second time points to said data messages.

2. The communication module according to claim 1, wherein the means for receiving the sensor signals and the processing unit are adapted to receive and process electromyographic (EMG) signals form an EMG sensor.

3. The communication module according to claim 1, wherein the processing unit is adapted to determine the first time points by determining amplitude peaks in said sensor signals.

4. The communication module according to claim 1, wherein:
   said wireless communication protocol is a regularly repeating transmission time slot based protocol, and
   said processing unit is adapted to determine said second time points using predefined information on the time slot allowed for said communication unit to transmit messages.

5. The communication module according to claim 1, wherein the processing unit is adapted to detect predefined characteristic features from the sensor signals using a feature detection algorithm coded in the processing unit and to include data relating to each characteristic feature found to the next data message.

6. The communication module according to claim 1, further comprising a memory unit for storing an identifier of the communication module and in that the processing unit is adapted to include said identifier in said data messages.

7. The communication module according to claim 1, further comprising being capable or receiving data messages from another similar communication module and to relay said received data messages or at least part of the data contained in the received data messages with its own data messages.

8. The communication module according to claim 1, further comprising means for mounting the communication module to a mounting zone on a sports item, the means for mounting comprising two or more electronic contact terminals for making an electronic contact with the sports item while being mounted thereon, and the processing unit is functionally connected to said contact terminals and to said wireless communication unit and capable of processing data received through the contact terminals and/or the wireless communication unit according to data processing instructions, and wherein
the communication module comprises means for reading an identifier from the sports item while being mounted thereon, and
the processing unit is capable of changing said data processing instructions based on the value of the identifier read from the sports item.

9. The communication module according to claim 7, wherein the processing unit is configured to include in the relayed data an identifier of the other similar data module and information on the duration from the time of receipt of the data to be relayed to the time of relaying of said data.

10. The communication module according to claim 9, wherein the data processing instructions comprise instructions for said sensor signal analysis algorithm.

11. The communication module according to claim 9, wherein:
the communication module comprises a memory for storing a set of data processing instructions corresponding to different identifiers and the processing unit is capable of choosing the data processing instructions from said set of data processing instructions based on the value of the identifier read, and/or
the processing unit is capable of sending a request for data processing instructions corresponding to the value of the identifier read and receiving said data processing instructions through said wireless communication unit to/from the external wireless device and optionally storing the received data processing instructions in the set of data processing instructions in said memory.

12. A device for monitoring physical performance, comprising:
means for receiving a plurality of successive messages from a plurality of communication modules each connected to one or more sensors, said messages each comprising at least a first data field comprising first data derived from a respective sensor and a second data field comprising second data on the time of origin of said first data,
processing means capable of extracting from the messages said first data and said second data, and
means for storing at least part of the first data extracted from said plurality of messages in a chronological order in a data structure based on said second data.

13. The device according to claim 12, wherein said means for storing are adapted to store said data structure as one or more files in a memory unit of the device.

14. A personal performance monitoring system, comprising:
a plurality of communication modules comprising:
means for continuously receiving sensor signals from a sensor connected to the communication module,
a processing unit adapted to continuously process the sensor signals and to form a plurality of successive data messages containing data at least partly derived from the sensor signals, and
a wireless communication unit for transmitting the formed data messages to an external wireless receiver device at a plurality of successive transmission time slots using a wireless communication protocol,
wherein the processing unit is adapted to:
execute a sensor signal analysis algorithm so as to determine first time points based on predefined characteristics of the sensor signals,
determine second time points corresponding to the temporal transmission slots for transmitting of data messages corresponding to said characteristics using the wireless communication unit, and
add information on the difference between the first and second time points to said data messages,
and
a monitoring device comprising:
means for receiving a plurality of successive messages from a plurality of communication modules each connected to one or more sensors, said messages each comprising at least a first data field comprising first data derived from a respective sensor and a second data field comprising second data on the time of origin of said first data,
processing means capable of extracting from the messages said first data and said second data, and
means for storing at least part of the first data extracted from said plurality of messages in a chronological order in a data structure based on said second data.

15. The system according to claim 14, further comprising:
one or more sports garments comprising a plurality of EMG sensors connected to a plurality of mounting zones each comprising means for holding a communication module and contact means for connecting the communication module electrically to at least one of said EMG sensors.

16. The system according to claim 15, wherein the one or more sports garments comprises sports pants comprising EMG sensors for measuring muscle activity from both legs, the sensors being arranged in one, two or more sensor groups each being connected to a separate mounting zone.

17. A method of monitoring a physical performance of a person, comprising:
measuring at least two different performance-related signals at different locations of the body or equipment of the person using at least two different sensors contained in one or more sports items and functionally connected to at least two different communication modules, respectively,
forming messages containing data derived from said signals, and
transferring said messages from the communication modules wirelessly to a central monitoring unit,
determining time differences between said signals and said transferring of the messages corresponding to said signals,
including information on the time differences to said messages, and
processing the signals in the central monitoring unit using said information on the time differences.

18. The method according to claim 17, wherein at least one of said performance-related signals is an electromyographic (EMG) signal measured from a body part of the person.

19. The method according to claim 17, wherein at least one of said performance-related signals is an acceleration, orientation or position signal measured from a body part of the person or equipment carried by the person.

20. The method according to claim 17, wherein for at least one of said signals said determining of time differences, forming of messages and/or including information on the time differences is carried out by a processing unit contained in the communication module.

21. The method according to claim 17, wherein for at least one of said signals said determining of time differences, forming of messages and/or including information on the time differences is carried out by a processing unit contained in the sports item.

22. The method according to claim 17, further comprising using communication modules comprising:
- means for continuously receiving sensor signals from a sensor connected to the communication module,
- a processing unit adapted to continuously process the sensor signals and to form a plurality of successive data messages containing data at least partly derived from the sensor signals, and
- a wireless communication unit for transmitting the formed data messages to an external wireless receiver device at a plurality of successive transmission time slots using a wireless communication protocol, wherein the processing unit is adapted to:
- execute a sensor signal analysis algorithm so as to determine first time points based on predefined characteristics of the sensor signals,
- determine second time points corresponding to the temporal transmission slots for transmitting of data messages corresponding to said characteristics using the wireless communication unit, and
- add information on the difference between the first and second time points to said data messages, and a central monitoring device comprising:
- means for receiving a plurality of successive messages from a plurality of communication modules each connected to one or more sensors, said messages each comprising at least a first data field comprising first data derived from a respective sensor and a second data field comprising second data on the time of origin of said first data,
- processing means capable of extracting from the messages said first data and said second data, and
- means for storing at least part of the first data extracted from said plurality of messages in a chronological order in a data structure based on said second data.

* * * * *